United States Patent [19]

Dempo

[11] Patent Number: 4,959,142
[45] Date of Patent: Sep. 25, 1990

[54] WATER TREATING APPARATUS

[75] Inventor: Fumio Dempo, Saitama, Japan

[73] Assignees: Aoi Fukuda; Kiyoko Suzuki, both of Japan

[21] Appl. No.: 210,639

[22] Filed: Jun. 23, 1988

[30] Foreign Application Priority Data

Jan. 29, 1988 [JP] Japan .................................. 63-17438

[51] Int. Cl.⁵ .............................................. C02F 9/00
[52] U.S. Cl. .................................... 210/167; 210/205;
210/223; 210/259; 210/263; 422/186.01;
422/186.07; 422/186.1; 422/186.3; 261/36.1;
261/76; 261/DIG. 42; 261/DIG. 80; 366/174;
250/435
[58] Field of Search ................ 210/192, 205, 219, 220,
210/221.1, 221.2, 222, 223, 259, 260, 263, 287,
695, 748, 760, 169, 167; 422/24, 28; 261/36.1,
76, DIG. 42, DIG. 75, DIG. 80; 250/430, 431,
435, 438; 366/136, 137, 167, 173, 174, 341

[56] References Cited

U.S. PATENT DOCUMENTS

| | | | |
|---|---|---|---|
| 2,857,520 | 10/1958 | Wilgen | 250/430 |
| 4,002,918 | 1/1977 | Graentzel | 210/431 |
| 4,028,246 | 6/1977 | Lund et al. | 422/24 |
| 4,548,716 | 10/1985 | Boeve | 210/760 |
| 4,595,498 | 6/1986 | Cohen et al. | 210/192 |
| 4,601,822 | 7/1986 | Zamburro | 210/223 |
| 4,640,782 | 2/1987 | Burleson | 210/760 |
| 4,655,933 | 4/1987 | Johnson et al. | 210/760 |
| 4,752,401 | 6/1988 | Bodenstein | 210/746 |
| 4,804,478 | 2/1989 | Tamir | 210/192 |

Primary Examiner—W. Gary Jones
Assistant Examiner—Matthew Savage
Attorney, Agent, or Firm—Klauber & Jackson

[57] ABSTRACT

To sterilize and purify continuously water in a water tank, a water treating apparatus is provided that comprises a circulating type water pipe for taking the water in the water tank outside the water tank and then for returning the water into the water tank, and an ozone supply apparatus, a filtering apparatus, and an ultraviolet-light irradiating apparatus that are situated in the course of the water pipe, so that water can be sterilized and purified thoroughly by a three-stage treatment incluing "an ozone treatment" wherein the decomposition of organic substances, deodorization and inactivation of microorganisms by ozone can be expected, "a filtering treatment" wherein the elimination of foreign matters and microorganisms can be expected, "an ultraviolet treatment" wherein the sterilization by ultraviolet rays can be expected.

8 Claims, 5 Drawing Sheets

WATER TREATING APPARATUS

The present invention relates to a water treating apparatus that can continuously treat water in a water tank by sterilizing and purifying water running in a water pipe.

BACKGROUND OF THE INVENTION

Water tanks used, for example, for pools or public bathhouses will be contaminated by swimmers or bathers because their sweat, nasal mucus, dirt, hair, etc. will be brought thereinto to cause the contamination. Although usually the water in the tanks is filtered to be purified by using a filter, the contaminants mentioned above can gradually accumulate in the filter, leading to a situation wherein bacteria grow in the filter. Elimination or sterilization of the bacteria thus grown in the filter is carried out, for example, by the supply of water to compensate the overflow or by the supply of fresh water, or by backwashing, or by charging with a chlorine sterilizer.

However, once the filter or the tank has become a site where bacteria inhabit, the bacteria are barely killed by supplying water or by charging with chlorine, and in addition the chlorine reacts with organic materials in the water to become combined chlorine, leading to the occurrence of organic materials in the filter.

Therefore, the inventor paid attention to the subject, and previously suggested an ozone supply apparatus (see Japanese Patent Application No. JP63-200891) suitable for sterilizing and purifying water. By circulating water in a water tank through the ozone supply apparatus, a more positive sterilization and purifying treatment became possible.

SUMMARY OF THE INVENTION

The present invention has been made on the basis of the previous suggestion and the object of the invention is to provide a water treating apparatus that can continuously treat water in a water tank by sterilizing and purifying more positively and powerfully the water running in a water pipe.

The above object and other objects, advantages and features of the present invention will become apparent easily from the following detailed description and the accompanying drawings. Particularly the description of preferable illustrative embodiments of the present invention taken in connection with the accompanying drawings will make the features of the present invention clearer.

PREFERRED EMBODIMENTS

Figure 1:
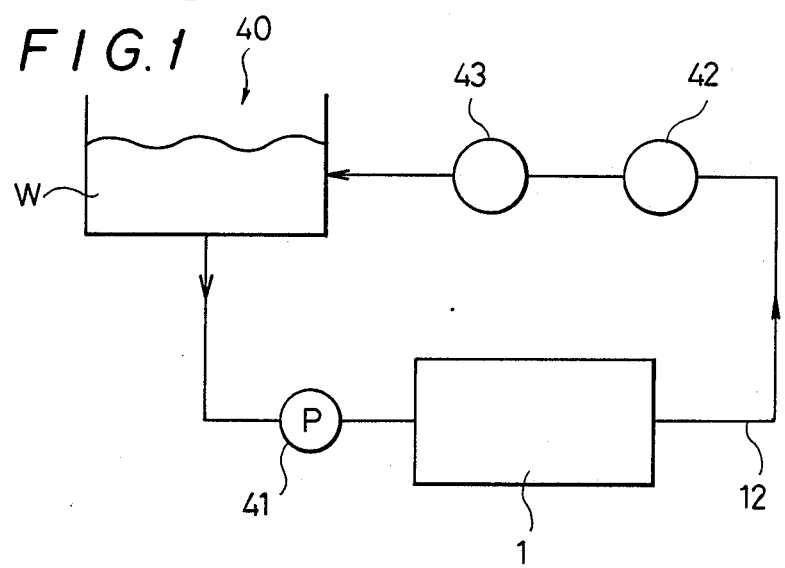
FIG. 1 is a schematic diagram of an embodiment of a water treating apparatus of the present invention.
Figure 3:
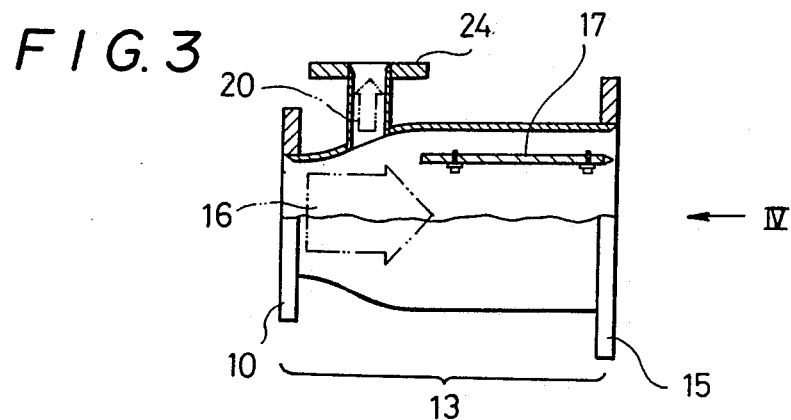
FIG. 3 is a schematic side view of a magnetic treating section partly in cross section.
Figure 4:
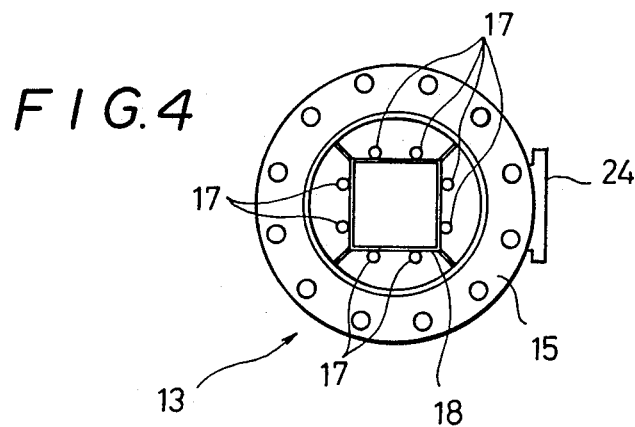
FIG. 4 is a schematic side view of the magnetic treating section in the direction of the arrow IV in FIG. 3.
Figure 2:
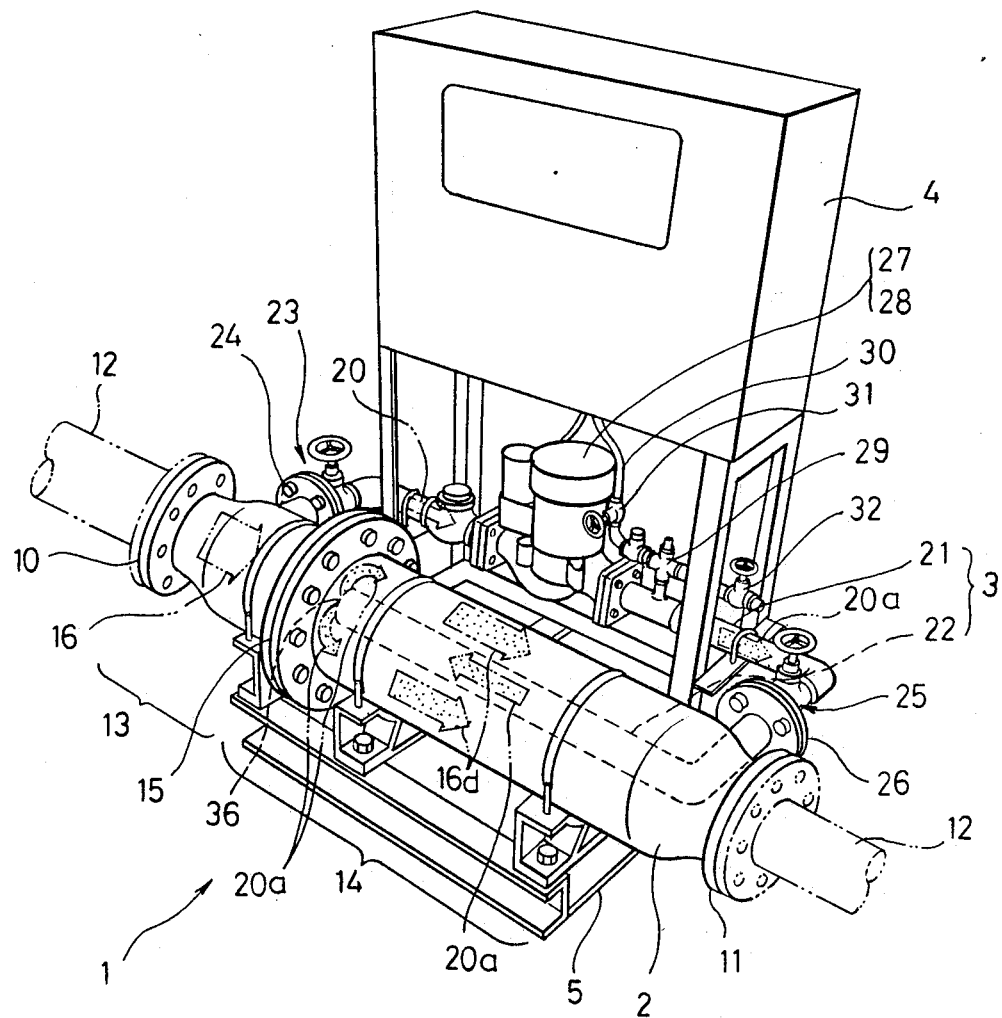
FIG. 2 is a schematic perspective view of an ozone supply apparatus.
Figure 5:
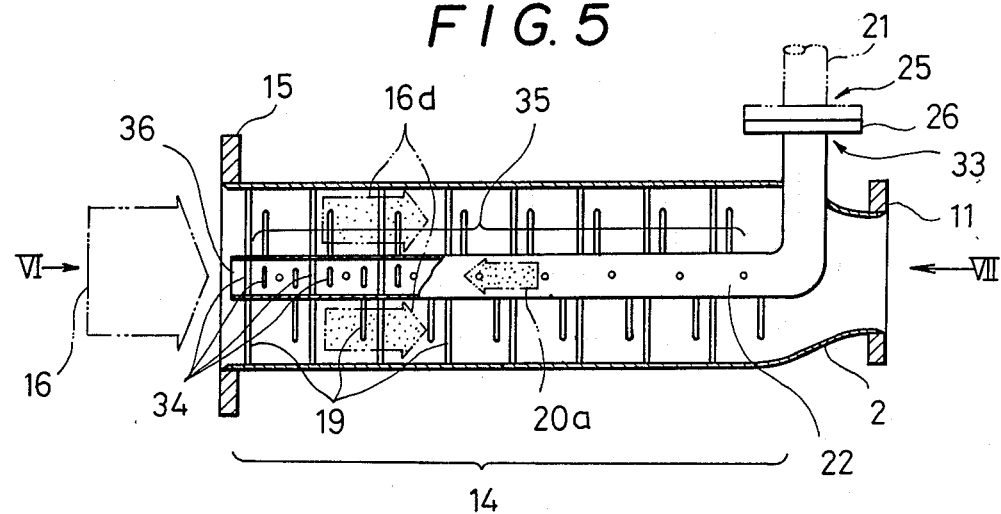
FIG. 5 is a schematic side sectional view of a secondary mixing section.
Figure 6:
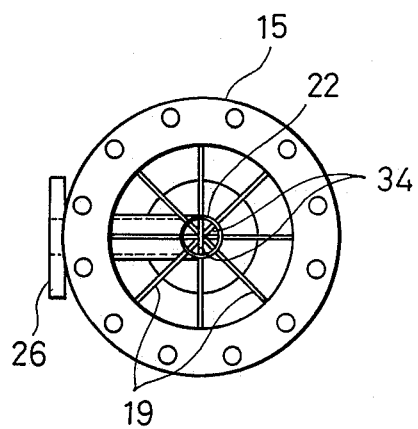
FIG. 6 is a schematic side view of the secondary mixing section in the direction of the arrow VI in FIG. 5.
Figure 7:
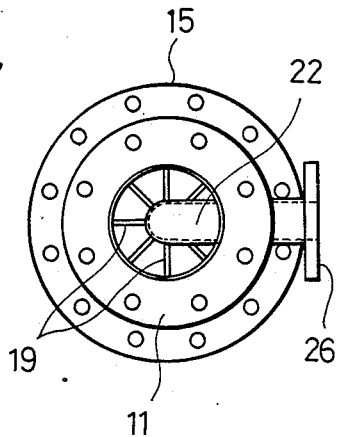
FIG. 7 is a schematic side view of the secondary mixing section in the direction of the arrow VII in FIG. 5.
Figure 8:
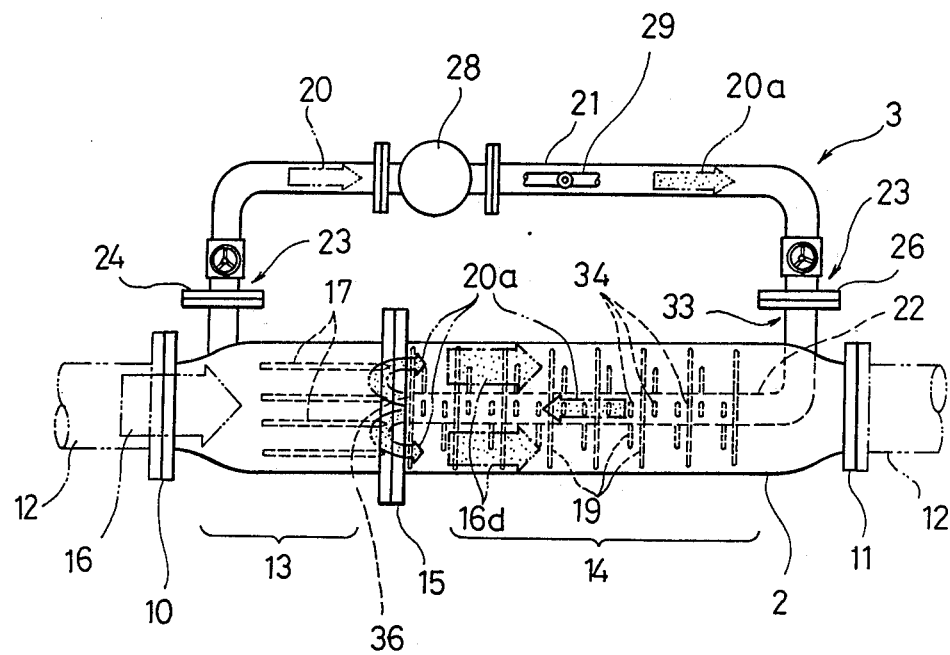
FIG. 8 is a schematic plan view of a main pipe and a flow separating pipe, showing the state of the flow of water.

Preferred embodiments of the present invention that are, for example, for treating water in a pool will now be described with reference to FIGS. 1 to 12.

Reference numeral 40 indicates a pool, the pool 40 is provided with a water pipe 12 that is of a circulating type for taking the water W in the tank outside the tank and then for returning the water W into the tank, and a pump 41 circulates the water W at a rate of 1 m/sec or over. The water pipe 12 is provided with along the path of an ozone supply apparatus 1, a filtering apparatus 42 and an ultraviolet-light irradiating apparatus 43.

First, the ozone supply apparatus 1 will be described (see FIGS. 2 to 8).

The main part of the ozone supply apparatus 1 is made up of a main pipe 2 and a flow separating pipe 3, and is further provided with a control box 4 and a frame body 5.

The main pipe 2 is fitted in the course of the water pipe 12 via flange sections 10, 11, and consists of a magnetic treating section 13 situated upstream of the water flow, and a secondary mixing section 14 situated upstream of the water flow, and the sections 13, 14 can be separated at a flange section 15. The magnetic treating section 13 includes a bracket 18 having eight bar magnets 17 that will be exposed to the main water flow 16 as "water W" running through the main pipe 2, and the bar magnets 17 magnetically treat previously the main water flow 16 so as to facilitate the mixing and dissolution of ozone into the main water flow 16. The secondary mixing section 14, is provided with a plurality of radially extending resistance rods 19 that are situated generally on the downstream side of the main pipe 2 and are orthogonal to the direction of the main water flow 16, and the agitation by the resistance rods 19 causes the main water flow 16 and a separated flow 20a to which ozone has been introduced (as described later) to mix.

A flow separating pipe 3 is made up of a side pipe 21 and an internal pipe 22. The side pipe 21 has its base end 23 (that is, the base end of the flow separating pipe 3) connected to the upstream side of the main pipe 2 via a flange section 24 and its forward section 25 connected via a flange section 26 to a base section 33 of the internal pipe 22 inserted into the central section of the main pipe 2 from the downstream side of the main pipe 2, and is provided with a pressurizing section 28 comprising a pump 27 for pressurizing a separated flow 20 running in the side pipe 21 so as to discharge the separated flow 20 into the main pipe 2 against the main water flow 16 as described later, and an ozone injecting section 29 for injecting ozone into the separated flow 20. Ozone is supplied into the ozone injecting section 29 from an ozonizer (not shown) provided in the control box 4 via a compressor (not shown), a hose 30 and a supply port 31. Reference numeral 32 indicates an extra supply port to which an additional ozonizer will be connected when an additional amount of ozone is required. As described above the internal pipe 22 connected to the side pipe 21 is inserted into the central section of the main pipe 2 from the downstream side of the main pipe 2, is extended in parallel with the main pipe 2 toward the upstream side of the main pipe 2, and is supported by the resistance rods 19 of the secondary mixing section 14. The internal pipe 22 has therein a primary mixing section 35 that has a plurality of resistance rods 34 extending orthogonally to the the separated flow 20a to which ozone has been injected, and the internal pipe 22 serves to stir the separated flow 20a thereby mixing primarily the ozone into the separated flow 20a, and also serves to discharge the separated flow 20a into the main pipe 2 against the main water flow 16 from its forward end 36 (that is, the forward end of the flow separating pipe 3) to cause the flows 20a, 16 to collide thereby mixing the flows 20a, 16.

Consequently, in the ozone supply apparatus 1, firstly, the mixing and dissolution of the ozone is facilitated by the previous magnetic treatment in the magnetic treating section 13, secondly, the separated flow 20 is formed by the side pipe 21, and the ozone is injected easily into the separated flow 20, thirdly, the separated flow 20a to which the ozone has been injected is stirred by the primary mixing section 35 provided in the internal pipe 22 to mix and dissolve the ozone primarily, fourthly, the separated flow 20a that has been subjected to the primary mixing and dissolution treatment is discharged into the main pipe 2 from the internal pipe 22 against the main water flow 16 to cause the water flows 20a, 16 to collide thereby mixing the water flows 20a, 16, and fifthly, the resulting combined main water flow 16d is stirred and mixed in the secondary mixing section 14 situated outside the internal pipe 22 and inside the main pipe 2, so that the ozone can be injected into, mixed with, and dissolved into a high-speed water flow quickly and thoroughly.

Of course, the present invention is not limited to the illustrated arrangement of the resistance rods 19, 34 or the illustrated order of the pressurizing section 28 and the ozone injecting section 29. Further, although the arrangement to provide the flange section 15 between the magnetic treating section 13 and the primary mixing section 35 or to connect the main pipe 2 and the water pipe 12 at the flange sections 10, 11 is useful because of the maintenance, control, and check of the ozone supply apparatus, the arrangement is naturally not essential in the present invention. A pressure gauge is suitably provided to each of the ozone injecting section 29, the pressurizing section 28, the main pipe 2, etc., as desired, but such a pressure gauge is not shown.

As the filtering apparatus 42, a known filter is used. The filter is of the cartridge type (not shown), and therefore maintenance such as replacement is easy. Since the water W in the water pipe 12 is filtered through this filter, minute foreign matters, and dirt as well as microorganisms in the water W can be separated. Activated charcoal, ion exchange resin, or the like may be contained in the filter used as the filtering apparatus 42 to adsorb and eliminate undesired ions that will be present in the water W.

Figure 9:
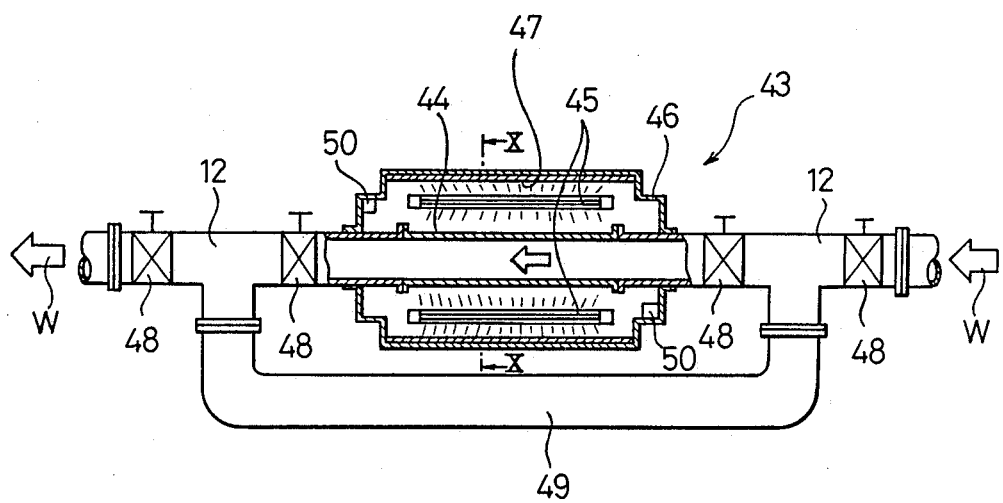
FIG. 9 is a schematic side view, partly in cross section, showing an ultraviolet-light irradiating apparatus.
Figure 10:
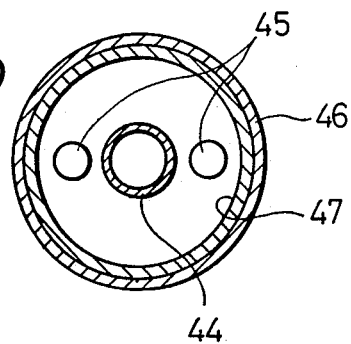
FIG. 10 is a cross-sectional view taken along the line X—X in FIG. 9.

Now the ultraviolet-light irradiating apparatus 43 will be described (see FIGS. 9 and 10). The ultraviolet-light irradiating apparatus 43 is formed with a transparent pipe 44 that constitutes part of the water pipe 12, and ultraviolet lamps 45 are situated near the side of the transparent pipe 44 so that ultraviolet rays may be shed toward the water W running through the transparent pipe 44. Specifically, the ultraviolet-light irradiating apparatus 43 of this embodiment consists mainly of a transparent pipe 44 of quartz glass, the ultraviolet lamps 45, and a protective case 46. The transparent pipe 44 is incorporated into and connected to the water pipe 12 to form part of the water pipe 12 continuously so that the water W running in the water pipe 12 can pass through the transparent pipe 44 as it is. The ultraviolet lamps 45 are two in number, have a capacity of 40 W, and are arranged symmetrically around the transparent pipe 44 (in some cases, in accordance with the length and the diameter of the water pipe 12, the ultraviolet lamps 54 may have a capacity in the order of 170 W, or the number of the ultraviolet lamps 45 can be changed.). The transparent pipe 44 and the ultraviolet lamps 45 are surrounded and protected in the protective case 46 connected to the water pipe 12. Further, a reflective mirror 47 is provided on the inside of the protective case 46 so that the ultraviolet rays from the ultraviolet lamps 45 can be reflected continuously into the water W in the transparent pipe 44 efficiently.

Reference numerals 48 indicate valves, and reference numeral 49 indicates a by-pass. The valves 48 can control the water W to the transparent pipe 44 or the water W to the by-pass 49. These valves 48 are connected to acoustic sensors 50, and when the transparent pipe 44 is accidentally broken by an earthquake or the like, the sound due to the breakage is sensed by the acoustic sensors 50 to open the valves 48 thereby automatically leading the water W to the by-pass 49. Since the water W running in the transparent pipe 44 is subjected to ultraviolet sterilization by the ultraviolet lamps 44 as described above, bacteria, and microorganisms in the water W are completely killed, and the water W can be positively sterilized as well as the inner wall section of the water pipe 12 can be prevented from having rust and tubercles.

Figure 11:
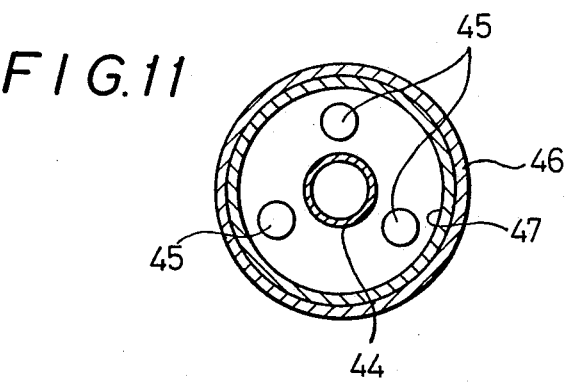
FIGS. 11 and 12 are cross-sectional views corresponding to that of FIG. 10, showing other embodiments of the ultraviolet-light irradiating apparatus.
Figure 12:
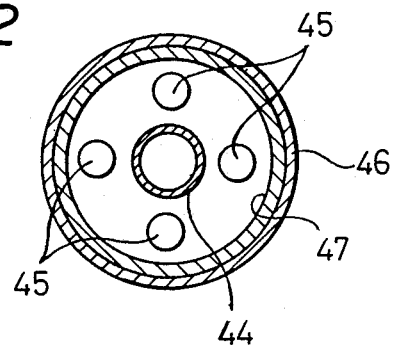

FIGS. 11 and 12 show other embodiments of the present invention. In these embodiments, three ultraviolet lamps 45 (see FIG. 11) are arranged uniformly around the transparent pipe 44, or four ultraviolet lamps 45 arranged uniformly around the transparent pipe 44 (see FIG. 12), so that the amount of the ultraviolet rays may be increased to effect more positive sterilization of the water W. Other constitution and operations of these embodiments are the same as those of the embodiment shown in FIGS. 9 and 10, so that the repeated description thereof is omitted.

Although the ultraviolet-light irradiating apparatus 43 may be provided in the water pipe 12 that is extended horizontally, the ultraviolet-light irradiating apparatus 43 may be provided in a water pipe (not shown) extending vertically or slantly. It is not necessarily required to effect the irradiation of the ultraviolet rays continuously, but the irradiation can be effected intermittently in accordance with the state (or use conditions) of the flow of water.

When such a ultraviolet-light irradiating apparatus is used, various advantages can be expected as described below.

Since in addition to ozone treatment by the ozone supply apparatus 1, ultraviolet-rays are shed to the water running through the water pipe, the occurrence of bacteria, microorganisms, etc. in the water W that will cause the occurrence of rust and tubercles can be suppressed, and the water pipe can be kept clean semi-permanently, further since the water W is sterilized again by the ultraviolet rays, the water W is further made hygienic and activated, and the thus treated water W can be particularly preferably used as water for daily use, since ultraviolet rays are used, the present apparatus is hygienic and safe, and is advantageous in view of the installation work and the cost, since the transparent pipe 44 and the ultraviolet lamps 45 are surrounded by the protective case 46, they would not be inadvertently damaged, and since the reflective mirror 47 is provided on the inside surface of the protective case 46, the ultraviolet rays from the ultraviolet lamps 45 can be used efficiently without any loss.

Now, when water of a pool is practically treated by the illustrated water treating apparatus, the changes in the quality of water, and the changes in the amounts of chemicals used are shown below.

| Chemical used | When started | 3 months after |
| --- | --- | --- |
| Chlorine | 10 l | 10 l |
| Aluminum sulfate | 4 kg | 1 kg |
| Soda ash | 2 kg | 1 kg |
| Constituent | | |
| Consumption of potassium permanganate | 12.8 ppm | 1.9 ppm |
| pH | 7.0 | 7.0 |
| Chromaticity | 2 | 1 or below |
| Turbidity | 2 | 1 or below |
| General bacillus | 3 | 0 |
| Colon bacillus | negative | negative |

Thus, when the illustrated water treating apparatus was used, it could be confirmed that it exhibited an excellent sterilizing and purifying effect on the water W. Specifically the consumption of potassium permanganate was decreased drastically to fare below the standard (3 ppm) for drinking water, which means that swimmers can swim in water having a quality higher than that for drinking water. Thus, since the illustrated water treating apparatus exhibits such an excellent sterilizing and purifying effect, chemicals such as aluminum sulfate and soda ash can be used in small amounts.

Although the above example is directed to a pool, the present invention is not limited to a pool but can be applied to public bathhouses, feed water tanks, and all other types of water tanks. Further a filter called a hair catcher can be situated between the water tank and the ozone supply apparatus. The ultraviolet-light irradiating apparatus is not limited to the above illustrated type, but may be of a type (not shown) having ultraviolet lamps contained in the water pipe.

As described above, since the water treating apparatus according to the present invention treats water in three steps, that is, "an ozone treating step", "a filtering step", and "an ultraviolet treating step", the water can be completely sterilized and purified, and therefore the water treating apparatus can exhibit an enough effect for hygienic control of pools and public bathhouses. Consequently, various specific effects can be expected as described below. That is, (a) the consumption of potassium permanganate for water in a water tank (or pool) can be decreased, which means that the amount of supplementary water can be reduced to cut down the expenditure;

(b) by the ozone sterilization, organic substances in the filtering apparatus are decomposed and the water quality itself is improved, so that the number of back-washing operations can be reduced;

(c) the dependence on chlorine for sterilizing and purifying is not required, the residual chlorine can be kept to the lowest standard of 0.4 ppm, and the effect by chlorine sterilization on the human body can be reduced as far as possible;

(d) since a high transparency of water can be kept due to the ozone sterilization, when the present water treating apparatus is applied to a pool, an increased pleasant feeling can be obtained when one swims therein; and (e) water in a water tank (feed water tank) can be made into high-quality drinking water.

What is claimed is:

1. A water treating apparatus for sterilizing and purifying water from a water tank, comprising a circulating type water pipe connected to withdraw water from said water tank outside the water tank and return the water to the water tank; an ozone supply apparatus, a filtering apparatus, and an ultraviolet-light irradiating apparatus being provided in series in the water pipe for treating the withdrawn water before its return to said tank; said ozone supply apparatus being provided with a main pipe situated in the course of the water pipe and having an upstream side for receiving the main water flow from said water tank, and a downstream side for discharging flow; a flow separating pipe having a base end being connected to the upstream side of the main pipe to divert a thereby separated flow therefrom, and the forward end of said flow separating pipe being inserted to be re-entrant into the central section of the main pipe from the downstream side of the main pipe so that part of the flow separating pipe may extend in parallel with the main pipe toward the upstream side of the main pipe, and the separated flow taken from said base end may be discharged from said forward end against the main water flow in the main pipe;

a magnetic treating section for magnetically treating the main water flow by a plurality of magnets arranged to be exposed to the main water being provided in the upstream side of said main pipe;

said flow separating pipe being provided with a pressurizing section for pressuring the separated flow for discharging same from said forward end, an ozone injecting section for injecting ozone into the separated flow, and a primary mixing section for mixing the injected ozone into the separated flow; and a secondary mixing section for mixing the separated flow that is discharged and with which the ozone has been mixed and the main water flow is provided in the downstream side of the main pipe.

2. A water treating apparatus as claimed in claim 1, in which said filtering apparatus is provided with a filter containing activated charcoal or an ion exchange resin.

3. A water treating apparatus as claimed in claim 2, in which said ultraviolet-light irradiating apparatus is provided with a transparent pipe that is incorporated and connected as part of the water pipe, ultraviolet lamps that are arranged around said transparent pipe and are capable of irradiating the water running in the water pipe with ultraviolet rays, and a protective case that has a reflective mirror on the inside surface and surrounds said transparent pipe and said ultraviolet lamps.

4. A water treating apparatus as claimed in claim 1, in which said ultraviolet-light irradiating apparatus is provided with a transparent pipe that is incorporated and connected as part of the water pipe, ultraviolet lamps that are arranged around said transparent pipe and are capable of irradiating the water running in the water pipe with ultraviolet rays, and a protective case that has a reflective mirror on the inside surface and surrounds said transparent pipe and said ultraviolet lamps.

5. A water treating apparatus for sterilizing and purifying water, comprising an ozone supply apparatus, a filtering apparatus, and an ultraviolet-light irradiating apparatus which are provided in the course of a water pipe for running water, said ozone supply apparatus being provided with a main pipe situated in the course of the water pipe and having an upstream side for receiving the main water flow from said water pipe, and a downstream side for discharging flow; a flow separating pipe having a base end being connected to the upstream side of the main pipe to divert a thereby separated flow therefrom; and the forward end of said flow separating pipe being inserted to be re-entrant into the central section of the main pipe from the downstream side of the main pipe so that part of the flow separating pipe may extend in parallel with the main pipe toward the upstream side of the main pipe, and the separated flow taken from said base end may be discharged from said forward end against the main water flow in the main pipe;

a magnetic treating section for magnetically treating the main water flow by a plurality of magnets arranged to be exposed to the main water flow being provided in the upstream side of said main pipe;

said flow separating pipe being provided with a presurizing section for pressurizing the separated flow for discharging said from said forward end, an ozone injecting section for injecting ozone into the separated flow, and a primary mixing section for mixing the injected ozone into the separated flow; and a secondary mixing section for mixing the separated flow that is discharged and with which the ozone has been mixed and the main water flow is provided in the downstream side of the main pipe.

6. A water treating apparatus as claimed in claim 5, in which said filtering apparatus is provided with a filter containing activated charcoal or an ion exchange resin.

7. A water treating apparatus as claimed in claim 6, in which said ultraviolet-light irradiating apparatus is provided with a transparent pipe that is incorporated and connected as part of the water pipe, ultraviolet lamps that are arranged around said transparent pipe and are capable of irradiating the water running in the water pipe with ultraviolet rays, and a protective case that has a reflective mirror on the inside surface and surrounds said transparent pipe and said ultraviolet lamps.

8. A water treating apparatus as claimed in claim 5, in which said ultraviolet-light irradiating apparatus is provided with a transparent pipe that is incorporated and connected as part of the water pipe, ultraviolet lamps that are arranged around said transparent pipe and are capable of irradiating the water running in the water pipe with ultraviolet rays, and a protective case that has a reflective mirror on the inside surface and surrounds said transparent pipe and said ultraviolet lamps.

* * * * *